US012634377B1

(12) United States Patent
Fay

(10) Patent No.: US 12,634,377 B1
(45) Date of Patent: May 19, 2026

(54) SYSTEMS AND METHODS TO TRIGGER NOTIFICATIONS BASED ON USER ACTIVITY IN A COLLABORATION ENVIRONMENT

(71) Applicant: Asana, Inc., San Francisco, CA (US)

(72) Inventor: Ari Wells Fay, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 235 days.

(21) Appl. No.: 18/193,844

(22) Filed: Mar. 31, 2023

(51) Int. Cl.
| *G06F 15/16* | (2006.01) |
| *H04L 67/1396* | (2022.01) |
| *H04L 67/55* | (2022.01) |

(52) U.S. Cl.
CPC .......... *H04L 67/55* (2022.05); *H04L 67/1396* (2022.05)

(58) Field of Classification Search
CPC ... H04L 67/55; H04L 67/1396; H04L 65/403; H04L 51/216; H04L 65/4015; H04L 67/535; G06Q 10/101; G06Q 10/103; G06Q 10/06313
See application file for complete search history.

(56) References Cited

U.S. PATENT DOCUMENTS

| 5,233,687 | A | 8/1993 | Henderson, Jr. |
| 5,524,077 | A | 6/1996 | Faaland |
| 5,530,861 | A | 6/1996 | Diamant |
| 5,608,898 | A | 3/1997 | Turpin |
| 5,611,076 | A | 3/1997 | Durflinger |

| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |
| 6,769,013 | B2 | 7/2004 | Frees |

(Continued)

FOREIGN PATENT DOCUMENTS

| CN | 101101205 A | 1/2008 |
| CN | 101305350 A | 11/2008 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Suraj M Joshi
*Assistant Examiner* — Hao H Nguyen
(74) *Attorney, Agent, or Firm* — Esplin & Associates, PC

(57) ABSTRACT

Systems and methods to trigger notifications based on user activity in a collaboration environment are described herein. Exemplary implementations may perform one or more of: manage environment state information maintaining a collaboration environment; manage notification trigger information of the work unit records; detect occurrence of user activity that forms the basis of trigger events; responsive to detection of occurrence of the user activity, determine that trigger event criteria are satisfied; execute the responses; and/or other operations.

20 Claims, 4 Drawing Sheets

(56)  References Cited

U.S. PATENT DOCUMENTS

| | | |
|---|---|---|
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,340,410 B1 | 3/2008 | Vaillancourt |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,779,053 B2 | 8/2010 | Beck |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,491,249 B2 | 11/2016 | Rosenshine |
| 9,514,424 B2 | 12/2016 | Kleinbart |
| 9,565,246 B1 | 2/2017 | Tsypliaev |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,343,595 B2 * | 5/2022 | Soderbergh ........ H04N 21/4316 |
| 11,553,045 B1 | 1/2023 | Beauchamp |
| 11,735,320 B2 * | 8/2023 | Megerian ................. G06N 5/02 |
| | | 702/19 |
| 12,363,097 B2 * | 7/2025 | Kopack ................. H04L 63/083 |
| 12,399,670 B2 * | 8/2025 | Song ..................... H04L 65/403 |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0030992 A1 | 2/2004 | Moisa |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0111366 A1 | 6/2004 | Schneider |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Nobuhiro |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0190569 A1 | 8/2006 | Neil |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0106705 A1 | 5/2007 | Chalana |
| 2007/0143169 A1 | 6/2007 | Grant |

(56) References Cited

U.S. PATENT DOCUMENTS

| | | |
|---|---|---|
| 2007/0147178 A1 | 6/2007 | Masuda |
| 2007/0150327 A1 | 6/2007 | Dromgold |
| 2007/0232278 A1 | 10/2007 | May |
| 2007/0245300 A1 | 10/2007 | Chan |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0005235 A1 | 1/2008 | Hegde |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0126945 A1 | 5/2008 | Munkvold |
| 2008/0134069 A1 | 6/2008 | Horvitz |
| 2008/0147453 A1 | 6/2008 | Kogan |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313595 A1 | 12/2008 | Boulineau |
| 2009/0048986 A1 | 2/2009 | Anderson |
| 2009/0055796 A1 | 2/2009 | Springborn |
| 2009/0076878 A1 | 3/2009 | Woerner |
| 2009/0077422 A1 | 3/2009 | Khaladkar |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Akritz |
| 2009/0307319 A1 | 12/2009 | Dholakia |
| 2010/0005087 A1 | 1/2010 | Basco |
| 2010/0036929 A1* | 2/2010 | Scherpa ................... H04L 51/04 |
| | | 709/207 |
| 2010/0063860 A1 | 3/2010 | Gallion |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0107333 A1 | 5/2011 | Kapoor |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0225293 A1 | 9/2011 | Rathod |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0018952 A1 | 1/2013 | Mcconnell |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0318589 A1 | 11/2013 | Ford |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0013104 A1* | 1/2014 | Vinnik .................. H04L 63/123 |
| | | 713/150 |
| 2014/0025767 A1 | 1/2014 | De Kezel |
| 2014/0036639 A1 | 2/2014 | Taber |
| 2014/0040780 A1* | 2/2014 | Artzt ..................... H04L 65/403 |
| | | 715/753 |
| 2014/0040905 A1 | 2/2014 | Tadanobu |
| 2014/0047560 A1 | 2/2014 | Meyer |
| 2014/0058801 A1 | 2/2014 | Deodhar |
| 2014/0059910 A1 | 3/2014 | Norton |
| 2014/0074536 A1 | 3/2014 | Meushar |

(56) References Cited

U.S. PATENT DOCUMENTS

| | | | |
|---|---|---|---|
| 2014/0082093 A1* | 3/2014 | Savage | H04L 41/50 709/206 |
| 2014/0089719 A1 | 3/2014 | Daum | |
| 2014/0101310 A1 | 4/2014 | Savage | |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0350997 A1 | 11/2014 | Holm | |
| 2014/0351719 A1* | 11/2014 | Cattermole | G06Q 10/103 715/753 |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0193392 A1* | 7/2015 | Greenblatt | G06Q 10/109 715/205 |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | Mcclement | |
| 2016/0182311 A1 | 6/2016 | Borna | |
| 2016/0188145 A1 | 6/2016 | Gabor | |
| 2016/0216854 A1 | 7/2016 | Mcclellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0313934 A1 | 10/2016 | Isherwood | |
| 2016/0328217 A1 | 11/2016 | Hagerty | |
| 2016/0342927 A1 | 11/2016 | Reznik | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0061341 A1 | 3/2017 | Haas | |
| 2017/0068933 A1 | 3/2017 | Norton | |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0223069 A1 | 8/2017 | Arora | |
| 2017/0249577 A1 | 8/2017 | Nishikawa | |
| 2017/0257404 A1* | 9/2017 | Barber-Mingo | G06Q 10/06 |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0344754 A1 | 11/2017 | Kumar | |
| 2017/0344931 A1 | 11/2017 | Shenk | |
| 2017/0346861 A1 | 11/2017 | Pearl | |
| 2017/0351385 A1 | 12/2017 | Ertmann | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1 | 3/2018 | Carnevale | |
| 2018/0060818 A1 | 3/2018 | Yorichika | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0109421 A1 | 4/2018 | Laribi | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189736 A1 | 7/2018 | Guo | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0014070 A1 | 1/2019 | Mertvetsov | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0095839 A1 | 3/2019 | Yuki | |
| 2019/0095846 A1 | 3/2019 | Gupta | |
| 2019/0102700 A1 | 4/2019 | Babu | |
| 2019/0108419 A1* | 4/2019 | Coven | G06F 8/60 |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |
| 2019/0147386 A1 | 5/2019 | Balakrishna | |
| 2019/0155870 A1 | 5/2019 | Prakash | |
| 2019/0187987 A1 | 6/2019 | Fauchère | |
| 2019/0213509 A1 | 7/2019 | Burleson | |
| 2019/0265821 A1 | 8/2019 | Pearl | |
| 2019/0340296 A1 | 11/2019 | Cunico | |
| 2019/0340574 A1 | 11/2019 | Ekambaram | |
| 2019/0347094 A1 | 11/2019 | Sullivan | |
| 2019/0347126 A1 | 11/2019 | Bhandari | |
| 2019/0370320 A1 | 12/2019 | Kalra | |
| 2019/0378375 A1 | 12/2019 | Bolling, Jr. | |
| 2020/0019907 A1 | 1/2020 | Notani | |

(56) References Cited

U.S. PATENT DOCUMENTS

| | | | |
|---|---|---|---|
| 2020/0059539 A1 | 2/2020 | Wang | |
| 2020/0065736 A1 | 2/2020 | Relangi | |
| 2020/0074369 A1 | 3/2020 | Arcolano | |
| 2020/0162315 A1 | 5/2020 | Siddiqi | |
| 2020/0192538 A1 | 6/2020 | Karpe | |
| 2020/0192908 A1 | 6/2020 | Smith | |
| 2020/0193556 A1 | 6/2020 | Jin | |
| 2020/0218551 A1 | 7/2020 | Sabo | |
| 2020/0228474 A1* | 7/2020 | Cameron | H04L 51/52 |
| 2020/0233879 A1 | 7/2020 | Papanicolaou | |
| 2020/0244611 A1 | 7/2020 | Rosenstein | |
| 2020/0265145 A1 | 8/2020 | Slabyak | |
| 2020/0328906 A1 | 10/2020 | Raghavan | |
| 2020/0344253 A1 | 10/2020 | Kurup | |
| 2020/0358628 A1 | 11/2020 | Achyuth | |
| 2021/0004380 A1 | 1/2021 | Koch | |
| 2021/0004381 A1 | 1/2021 | Smith | |
| 2021/0014136 A1 | 1/2021 | Rath | |
| 2021/0097466 A1 | 4/2021 | Sabo | |
| 2021/0103451 A1 | 4/2021 | Sabo | |
| 2021/0110347 A1 | 4/2021 | Khalil | |
| 2021/0136012 A1 | 5/2021 | Barbitta | |
| 2021/0182475 A1 | 6/2021 | Pelz | |
| 2021/0216562 A1 | 7/2021 | Smith | |
| 2021/0232282 A1 | 7/2021 | Karpe | |
| 2021/0312304 A1 | 10/2021 | Keena | |
| 2021/0320891 A1 | 10/2021 | Rosenstein | |
| 2021/0342786 A1 | 11/2021 | Jiang | |
| 2021/0382734 A1 | 12/2021 | Rosenstein | |
| 2022/0019320 A1 | 1/2022 | Sabo | |
| 2022/0058548 A1 | 2/2022 | Garg | |
| 2022/0075792 A1 | 3/2022 | Koch | |
| 2022/0078142 A1 | 3/2022 | Cameron | |
| 2022/0158859 A1 | 5/2022 | Raghavan | |
| 2022/0207489 A1 | 6/2022 | Gupta | |
| 2022/0239516 A1 | 7/2022 | Viswanathan | |
| 2022/0245563 A1 | 8/2022 | Schmidt | |
| 2023/0076595 A1 | 3/2023 | Baselga | |
| 2023/0186242 A1 | 6/2023 | Entin | |

FOREIGN PATENT DOCUMENTS

| | | |
|---|---|---|
| CN | 101563671 A | 10/2009 |
| CN | 101339642 B | 12/2011 |
| CN | 102378975 B | 5/2015 |
| CN | 106254615 A | 12/2016 |
| CN | 106330864 A | 1/2017 |
| CN | 108287786 A | 7/2018 |
| WO | 2015036817 A1 | 3/2015 |
| WO | 2015123751 A1 | 8/2015 |
| WO | 2015162550 A1 | 10/2015 |
| WO | 2016033493 A1 | 3/2016 |
| WO | 2016115154 A1 | 7/2016 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/ https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web. archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

(56)                References Cited

OTHER PUBLICATIONS

How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=IwF9XyUQrzw (Year: 2019).
Peter Wurman, "Coordinating Hundreds of Cooperative, Autonomous Vehicles in Warehouses, " 2008, AI Magazine, vol. 29, No. 1, pp. 9-19. (Year: 2008).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Sara Perez-Soler, "Towards Conversational Syntax for Domain-Specific Languages using Chatbots", 2019, Journal of Object Technology, vol. 18, No. 2, pp. 5:1-21. (Year: 2019).
Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).
Ghiani et al., Personalization of Context-Dependent Applications Through Trigger-Action Rules, ACM Transactions on Computer-Human Interaction vol. 24 Issue 2 Article No. 14 pp. 1-33 (Year: 2017).
Giuseppe Setanni, "A collaborative cyber incident management system for European Interconnected Critical infrastructures" 2017, Journal of Information Security and Applications, 34, pp. 166-182. 1-s2.0-S2214212616300576-main.pdf. (Year: 2017).
Sheth, A., Kochut, K.J., Workflow Applications to Research Agenda: Scalable and Dynamic Work Coordination and Collaboration Systems. In: Doga-, A., Kalinichenko, L., Ozsu, M.T., Sheth, A. (eds) Workflow Management Systems and Interoperability. NATO ASI Series, vol. 164. (Year: 1998).
Kerstin S. Haring, "FFAB-The Form Function Attribution Bias in Human-Robot Interaction." 2018, IEEE Transactions on Cognitive and Developmental Systems, vol. 10, No. 4, pp. 841-851. (Year: 2018).
Edward Stohr, "Workflow Automation: Overview and Research Issues," 2001, Information Systems Frontiers 3:3, pp. 281-296. ( Year: 2001).
N.R. Jennings, "Automated Negotiation: Prospects, Methods, and Challenges" 2001, Group Decision and Negotiation, 10, Kluwer Academic Publishers, pp. 199-215. (Year: 2001).
Prasetyo et al., "Development of real-time collaboration system for e-book writing", Nov. 1, 2015, IEEE, 2015 International Conference on Information Technology Systems and Innovation (ICITSI) (2015, pp. 1-7) (Year: 2015).
Mario Faiella, "Collaborative Attribute Retrieval in Environment with Faulty Attribute Managers." 2016, 11 International Conference on Availability, Reliability and Security, IEEE, pp. 296-303. (Year: 2016).
A. Bilberg, "Digital twin driven human-robot collaborative assembly," 2019, CIRP Annals, Manufacturing Technology, pp. 499-502. (Year: 2019).

* cited by examiner

SYSTEMS AND METHODS TO TRIGGER NOTIFICATIONS BASED ON USER ACTIVITY IN A COLLABORATION ENVIRONMENT

FIELD OF THE DISCLOSURE

The present disclosure relates to systems and methods to trigger notifications based on user activity in a collaboration environment.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. One advantage of a collaboration environment is that it may provide users with information about how they work, their efficiencies, and their inefficiencies. For example, collaboration environment may be configured to track and/or monitor user interactions with records for work through one or more user interfaces of the collaboration environment. This may allow a system to gather information about how a user does their work within the collaboration environment. This may produce information about the user that is meaningful to the user and/or other users (e.g., supervisors, manager, etc.). The inventor of the present disclosure has identified one or more technical problems with traditional tracking and/or monitoring features of a collaboration environment. In particular, one problem is that traditional tracking and/or monitoring features typically only reflect user interactions that resulted in a change or some other impact to the underlying records for work (e.g., work was marked complete, due date was pushed back, description was changed, etc.). Accordingly, these traditional tracking and/or monitoring features miss other types user activity within a collaboration environment that may also be desirable and/or valuable. For example, it may be desirable to know how users interact with the collaboration environment in ways that are not reflected by changes to the underlying records and/or a user interface of the collaboration environment. These types of user activity may be considered "passive" activities in that they may not impact the underlying records for work or how information is presented in a user interface, but may nonetheless be valuable to identify and track as they may be indicative of nefarious activity.

To address these and/or other problems, one or more implementations presented herein propose a system that triggers responses (e.g., notifications and the like) based on passive-type user activity. This activity may include interactions taken with respect to visual content presented in a user interface of the collaboration environment that may or may not result in change or impact to the visual content and/or underlying records for work. This may allow for the identification and tracking of activity that is otherwise undetectable by human review of a user interface and/or records of the collaboration environment. By way of non-limiting illustration, activity of interest may include one or more of viewing a user interface page of a record, copying text presented within a page of a record, copying a link to a page of a record, adding a user as a collaborator of a record, and/or other activity.

One or more implementations of a system configured to trigger notifications based on user activity in a collaboration environment may include one or more hardware processors configured by machine-readable instructions and/or other components. Executing the machine-readable instructions may cause the one or more hardware processors to facilitate one or more features and/or functions presented herein. The machine-readable instructions may include one or more computer program components. The one or more computer program components may include one or more of an environment state component, a user interface component, a detection component, and/or other components.

The environment state component may be configured to manage environment state information maintaining a virtual collaboration environment (sometimes referred to simply as "collaboration environment"). The virtual collaboration environment may be configured to facilitate interactions by users with the virtual collaboration environment. The users may interact with the virtual collaboration environment by accessing the virtual collaboration environment via remotely located client computing platforms over one or more Internet connections. The environment state information may include work unit records and/or other records. The work unit records may include work unit information describing units of work managed by the users, created by the users, and/or assigned within the virtual collaboration environment to the users who are expected to accomplish one or more actions to complete the units of work.

The work unit information may include notification trigger information and/or other information. The notification trigger information may include trigger event definitions and/or other information. The trigger event definitions may include one or more of trigger event criteria, trigger response values for trigger response parameters of the work unit records, and/or other information. The trigger event criteria may define user activity in the virtual collaboration environment that form the basis of trigger events. Occurrence of the user activity may cause the trigger event criteria to be satisfied. The trigger response parameters may characterize responses to be taken responsive to satisfaction of the trigger event criteria. The responses may include, generally, actions that cause one or more users to be notified. By way of non-limiting illustration, a first work unit record may include first notification trigger information including a first trigger event definition. The first trigger event definition may include a first trigger event criterion and a first response value of a first trigger response parameter. The first trigger event criterion may define a first user activity that forms the basis of a first trigger event. The first response value of the first trigger response parameter may characterize a first response to be taken responsive to satisfaction of the first trigger event criterion (e.g., occurrence of the first user activity by one or more users).

The detection component may be configured to detect occurrence of the user activity that forms the basis of the trigger events, and/or detect occurrence of other user activity. By way of non-limiting illustration, an occurrence of the first user activity being performed by a second user may be detected.

The detection component may be configured to determine that trigger event criteria are satisfied. The detection component may be configured to determine that trigger event criteria are satisfied responsive to the detection of the occurrence of the user activity. The detection component may be configured to execute the responses. The detection component may be configured to execute the responses responsive to occurrence of the user activity and/or determinations that trigger event criteria are satisfied.

As used herein, any association (or relation, or reflection, or indication, or correspondency) involving servers, processors, client computing platforms, and/or another entity or object that interacts with any part of the system and/or plays a part in the operation of the system may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
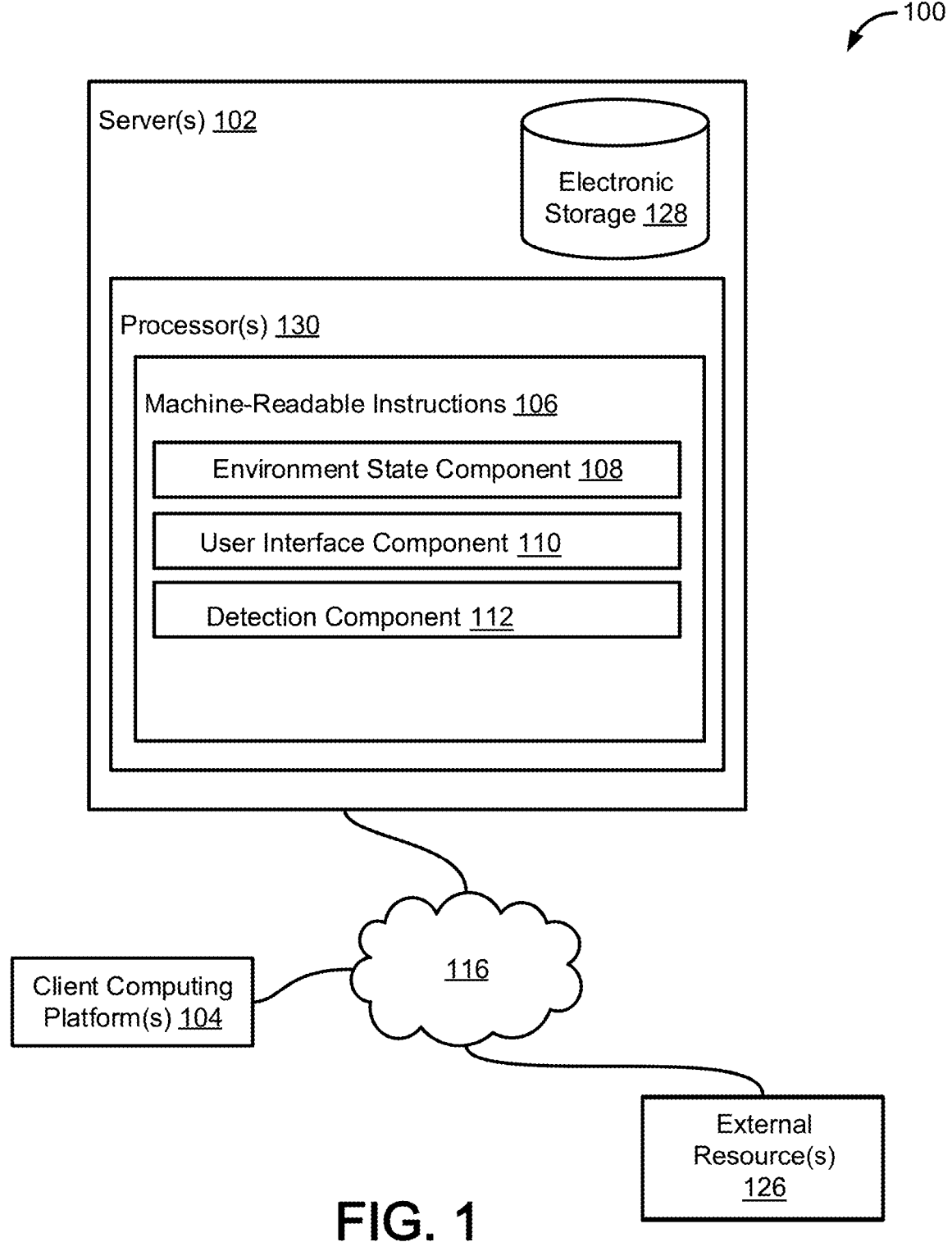
FIG. 1 illustrates a system configured to trigger notifications based on user activity in a collaboration environment, in accordance with one or more implementations.

FIG. 1 illustrates a system 100 configured to trigger notifications based on user activity in a collaboration environment, in accordance with one or more implementations. In particular, the user activity that triggers one or more notifications may include user activity that is otherwise undetectable by human review of a user interface and/or records of the collaboration environment.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store environment state information and/or other information. Machine-readable instructions 106 may include one or more instruction components. The instruction components may include computer program components. Executing the machine-readable instructions 106 may cause server(s) 102 to facilitate triggering notifications based on user activity in a collaboration environment. The computer program components may include one or more of an environment state component 108, a user interface component 110, a detection component 112, and/or other components.

Environment state component 108 may be configured to manage the environment state information and/or other information used in maintaining a collaboration environment. The collaboration environment may be configured to facilitate interaction by users with the collaboration environment. The environment state information may include one or more records. The records may include one or more of user records, work unit records, and/or other records. The user records may include user information describing the users of the collaboration environment. The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of and/or collaborate with one or more other users.

The "members" of the work unit records may include specifically named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are actively performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, portfolios, objectives, and/or other units of work.

Work unit records may be created by a given user for the given user and/or created by the given user and assigned to one or more other users. Work unit records may be created by a given user for the given user and/or created by the given user and managed by one or more other users.

Individual units of work may include and/or may be associated with one or more digital content items. An individual unit of work may include an individual digital content item by virtue of the individual digital content item (and/or a copy or instance thereof) being accessible via a work unit page of the unit of work (e.g., via link, URL, a pointer, and/or other techniques to provide access). A digital content item may include one or more of an image, a video, an audio file, a PDF, a word document, multimedia presentations, a webpage, and/or other digital content items.

In some implementations, work unit records created by, assigned to, and/or completed by the users may refer generally to a linking of the work unit records with the individual users in the collaboration environment. A work unit record may be linked with a user in a manner that defines one or more relationships between the user and the work unit record. Such a relationship may connote and/or be a result of an action (past, present, and/or future) of the user with respect to the work unit record. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

In some implementations, values of work unit parameters may specify one or more of a unit of work name, a unit of work description, user role information, one or more unit of work dates (e.g., a start date, a due date or end date, a completion date, and/or other dates), monetary budget and/or consumption, an amount of work production, project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), notification trigger information, one or more performance/ productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, a trigger response parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work or vice versa.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes but is otherwise approved. In some implementations, a status of revisions required may present the reviewing user with options to specify what revisions are required. In some implementations, a status of revisions required may cause a follow-up unit of work to be generated which is assigned back to the assignor of the original work.

In some implementations, values of a grouping parameter may describe whether a given unit of work supports (e.g., is included in) a project and/or objective. The values may specify one or more of a name/title of another work unit record (e.g., project, objective), a name/username of an owner of another work unit record, and/or other information.

In some implementations, notification trigger information may include trigger event definitions and/or other information. The trigger event definitions may include one or more of trigger event criteria, trigger response values for trigger response parameters of the work unit records, and/or other information.

The trigger event criteria may define user activity in the virtual collaboration environment that form the basis of trigger events. Occurrence of the user activity may cause the trigger event criteria to be satisfied. The user activity may be characterized by activity types. The activity types may include one or more of passive activity type, active activity type, and/or other types. The user activity that form the basis of the trigger events may include the user activity of the passive activity type.

The user activity of the passive activity type include the interactions by the users that do not impact appearance of one or more visual content items (e.g., user interface elements) in a user interface of the virtual collaboration environment and/or one or more records. By way of non-limiting illustration, a user interface of the collaboration environment may include pages associated with work unit records that provide access to the work unit information of the work unit records. The pages may include sets of visual content items that display and/or provide access to values of work unit parameters of a work unit record. Since user activity of the passive activity type may not impact appearance one or more visual content items in a user interface of the virtual collaboration environment, the user activity of the passive activity type may be undetectable by users who are viewing and/or otherwise interacting with the user interface. Using these types of activities as the basis for one or more responses provide improvements upon traditional systems that track activity that is otherwise still detectable through review of a record and/or visual specification of a user interface. The system 100 will instead allow tracking for otherwise undetectable activity which provides a mechanism to detect nefarious activity that a user may otherwise try to hide.

By way of non-limiting illustration, the user activity of the passive activity type include one or more of viewing a page of a work unit record, copying text presented within the page of the work unit record, copying a link to the page of the work unit record, and/or adding a user as a collaborator of the work unit record.

The user activity of the active activity type may include interactions of the users that do impact the appearance of one or more visual content items and/or one or more records. By way of non-limiting illustration, the user activity of the active activity type may include interactions of the users that impact the appearance of the pages of the work unit records.

In some implementations, user activity that does impact the appearance of a user interface and/or underlying records may include one or more of marking work as complete or incomplete, adding or changing text making up parts of a record (e.g., title, description), changing or adding dates (e.g., due date, start date, etc.), adding comments, up-voting a record and/or comment, deleting a record, creating a record, and/or other activity.

The trigger response parameters may characterize responses to be taken responsive to satisfaction of the trigger event criteria. The values for trigger response parameters (referred to as "trigger response values") may define the responses. The responses may include, generally, actions that cause one or more users to be notified. The values of a trigger response parameter may define a response. A response may be defined one or more of a response type, a response definition, and/or other information. In some implementations, a response may include a non-notification actions such as logging recorded action to a metrics-tracking platform.

A response type may define a type of response that it be taken. Response types may include one or more of record generation type, internal notification type, external notification type, and/or other types. Responses of the record generation type may include generating one or more work unit records to serve as the basis for notifying one or more users, assigning a user to one or more work unit records to serve as the basis for notifying the users, and/or other actions. Responses of the internal notification type may include generating one or more messages and/or alerts that are to be served to one or more users within the collaboration environment. Messages and/or alerts within the collaboration environment may include one or more of comments, direct messages, incident reports, and/or other communications managed within the collaboration environment. An incident report may include a document that describes one or more detected user activities. An incident report may be provided as a digital content item accompanying a work unit record. An incident report may be reported on a regular basis, e.g., monthly, weekly, and/or other periods. Responses of the external notification type may include generating one or more messages and/or alerts that are to be served to one or more users through one or more external resource 126 that operate and/or are managed outside the collaboration environment. Messages and/or alerts provided through one or more external resource 126 may include communications sent through one or more external communication applications (e.g., email, SMS, external messaging application, and/or other considerations).

A response definition may specify content of a response. Content of a response may include one or more of identification of a user who performed the triggering activity, identification of a page the activity was performed, on description of the activity, timestamp of the activity, a count of occurrences of the activity, a frequency of occurrence of the activity (if performed multiple times), and/or other information. In some implementations, a response may include links (e.g., hyperlinks, pointers, etc.) to the pages where user activity was performed. By way of non-limiting illustration, the response may include a title of a work unit record which itself may comprise a link to a work unit page. A response definition may specify how the content of the response appears in the response based on the response type. By way of non-limiting illustration, a response definition for a response of the record generation type may specify what appears in the title of the newly generated record, what appears in the description, etc. By way of non-limiting illustration, a generated record may include a title that conveys the record was generated as an automated response, while the description of the record may include the description of the activity, identity of user performing the activity, a timestamp, and/or other information.

By way of non-limiting illustration, a first work unit record may include first notification trigger information including a first trigger event definition. The first trigger event definition may include a first trigger event criterion and a first response value of a first trigger response parameter. The first trigger event criterion may define a first user activity that forms the basis of a first trigger event. The first response value of the first trigger response parameter may characterize a first response to be taken responsive to satisfaction of the first trigger event criterion (e.g., occurrence of the first user activity by one or more users).

In some implementations, work unit records may define tasks. The work unit records defining tasks may be referred to as task records. The work unit information in task records may be referred to as task information and/or other information. Task information may include values of work unit parameters for tasks managed within the collaboration environment. The work unit parameters for tasks may be referred to as "task parameters." The work unit parameters comprising task parameters may be specific to tasks and/or may include one or more parameters not shared with projects, objectives, and/or other records. The task parameters may characterize one or more tasks created, assigned, and/or managed within the collaboration environment and/or via the collaboration environment and/or the metadata associated with the one or more tasks.

In some implementations, work unit records may define projects. The work unit records defining projects may be referred to as project records. The work unit information in project records may be referred to as project information and/or other information. Project information may include values of work unit parameters for projects managed within the collaboration environment. The work unit parameters for projects may be referred to as "project parameters." The work unit parameters comprising project parameters may be specific to project records and may include one or more parameters not shared with tasks, objectives, and/or other records. The project parameters may characterize one or more projects created, owned, assigned, and/or managed within the collaboration environment and/or via the collaboration environment and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define portfolios. The work unit records defining portfolios may be referred to as portfolio records. The work unit information in portfolio records may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolio records and may include one or more parameters not shared with tasks, projects, objectives, and/or other records. The portfolio parameters may characterize one or more portfolios created, owned, assigned, and/or managed within the collaboration environment and/or via the collaboration environment and/or the metadata associated with the one or more portfolios. Individual ones of the portfolios may be associated with individual ones of the records. A given portfolio may have one or more owners and/or one or more collaborators working on the given portfolio. The given portfolio may be associated with one or more other units of work assigned to one or more users under the given portfolio heading. In some implementations, a given portfolio may not have any owners and/or collaborators at the portfolio level other than those specified with respect to the projects subordinate to the portfolio. In some implementations, portfolios may be associated with one or more units of work that may directly facilitate progress toward fulfillment of the portfolios. Accordingly, completion of units of work may directly contribute to progress toward fulfillment of the portfolio. By way of non-limiting illustration, an individual portfolio may be associated with a client, and the units of work under the individual portfolio heading may be work directly contributing to the fulfillment of a business relationship with the client.

The values of the portfolio parameters may, by way of non-limiting example, include and/or specify one or more of: information about one or more projects, tasks, and/or objectives within a given portfolio, information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information, permissions information, state of a workspace for a given project within the given portfolio, metadata associated with the portfolios, custom fields (e.g., values created by users), and/or other information.

In some implementations, work unit records may define objectives. The work unit records defining objectives may be referred to as objective records. The work unit information in objective records may be referred to as objective information. The objective information may include values of one or more work unit parameters that define the objectives. The values of the work unit parameters may be organized in objective records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objective may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or other dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining one or more record hierarchies of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information. In some implementations, a hierarchical arrangement may dictate access to different records within the hierarchy based on position and/or other information.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified objectively with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

In some implementations, managing the environment state information by the environment state component 108 may include maintaining queues of work unit records for units of work assigned to the users. The queues may be presented to the users in a user interface of the collaboration environment to facilitate access to the work unit records via work unit pages. Individual queues may represent the work unit records assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content items (e.g., icons) representing work unit records may be positioned in the cells. Columns may be associated with sections (e.g., different hierarchies, groupings, etc.), and the cells within the column may be populated with visual content items representing work unit records that are associated with the sections.

In some implementations, environment state component 108 may be configured to generate and/or manage page information defining work unit pages (sometimes referred to simply as "pages") corresponding to user records and/or work unit records. Individual work unit pages may provide access to individual records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

Users may access work unit records via the work unit pages by viewing, adding, changing, deleting, and/or otherwise interacting with values of work unit parameters stored by the work unit records and/or other records. In some implementations, work unit pages providing access to tasks may be referred to as task pages; work unit pages providing access to projects may be referred to as project pages; work unit pages providing access to objectives may be referred to as objective pages; and work unit pages providing access to portfolios may be referred to as portfolio pages. In some implementations, user pages may include views of the collaboration environment that provide access to user records.

The user interface component 110 may be configured to effectuate communication of user interface information to computing platform(s) 104 associated with the users so that the computing platform(s) 104 present instances of a user interface of the collaboration environment. The user interface information may include page information for pages of the collaboration environment so that the client computing platform(s) 104 present pages through which the users access the work unit records and/or other information. By way of non-limiting illustration, user interface component 110 may be configured to effectuate communication of user interface information to a first computing platform associated with a first user so that the first computing platform presents a first instance of the user interface of the collaboration environment.

A user interface of the collaboration environment may provide one or more views of the collaboration environment and/or provide other features and/or functionality. The one or more views may include one or more pages of the collaboration environment. In some implementations, an individual view of the collaboration environment may textually and/or graphically display information (e.g., values of parameters) from one or more of a user record, a task record, a project record, a portfolio record, an objective record, and/or other records. By way of non-limiting illustration, a view may display one or more of a work unit page, a project page, a portfolio page, an objective page, a queue of units of work, and/or other information.

The computing platform(s) 104 may present the work unit pages through which the users access work unit records and/or otherwise interact with the collaboration environment. Users may provide user input into the work unit pages. The user input may include one or more of selections user interface elements, text additions, drag and drop uploads of digital content items, provide copy commands to copy text from a page, provide a command to generate a paste-able link to a page, and/or other user input. Selections may be accomplished through touch-screen input, hovering a cursor and clicking a mouse, entering or typing commands into a command prompt, and/or other types of selections.

The user interface component 110 may be configured to obtain user input information conveying user input into the work unit pages and/or other user interfaces of the collaboration environment. In some implementations, the user input may include selection of one or more user interface elements to perform one or more of mark a task complete, add content to a work unit record (e.g., description, title, comments, etc.), up-vote a work unit record, up-vote a comment, create new work unit records, associate a work unit record with another work unit record, generate a record hierarchy, request generation of notification trigger information, assigning work unit records, specifying dates associated with units of work, and/or other user input.

In some implementations, user input into a user interface of the collaboration environment may convey requests to generate notification trigger information for individual work unit records. By way of non-limiting illustration, pages of a user interface of the collaboration environment may include a user interface element that, when selected, initiates the requests to generate the notification trigger information for a corroding work unit record. In some implementations, the user interface element may be configured so that it may only be visible and/or selectable by users of a given role, e.g., manager, supervisor, etc. For example, a drop down menu and/or virtual button that is only visible to users of a given role may be included in the pages. In this way, other users whose activity may be identified as a trigger event may be unaware of the tracking and/or subsequent responses being carried out. By way of non-limiting illustration, the first instance of the user interface presented on the first computing platform may display a first page associated with the first work unit record. The first page may display a user interface element whose selection causes the first notification trigger information to be generated.

In some implementations, users who provide the user input indicating the requests may become the subjects of the responses. By way of non-limiting illustration, for responses of the record generation type, a user who provided the user input may become an assignee of a subsequently generated work unit record that serves as a notification to that user. By way of non-limiting illustration, for responses of the internal notification type, a user who provided the user input may become a recipient of an internal message. By way of non-limiting illustration, for responses of the external notification type, a user who provided the user input may become a recipient of an external message. By way of non-limiting illustration, the first user may be a subject of the first response by virtue of the first user providing the user input to generate the first notification trigger information. However, in some implementations, users may provide user input to identify one or more other users who should be subject(s) of response(s).

The environment state component 108 may be configured to monitor the environment state information and/or user interfaces of the collaboration environment to identify user activity. In some implementations, environment state component 108 may be configured to identify user activity based on monitoring one or more of updates to values of work unit parameters of one or more work unit records, user actions with respect to visual content items of a user interface of the collaboration environment, and/or other monitoring.

The detection component 112 may be configured to detect occurrence of the user activity that forms the basis of the trigger events, and/or detect occurrence of other user activity. The detection component 112 may continuously and/or periodically query the environment state information to determine whether user activity that forms the basis of the trigger events have occurred. The detection component 112 may be configured to generate one or more of counts of occurrence, frequency of occurrence, and/or other information. By way of non-limiting illustration, an occurrence of the first user activity being performed by a second user may be detected.

The detection component 112 may be configured to determine whether trigger event criteria are satisfied. The detection component 112 may be configured to determine whether trigger event criteria are satisfied by comparing the trigger event criteria to user activity that has occurred. The detection component 112 may be configured to determine whether trigger event criteria are satisfied based on identifying individual work unit records of individual pages associated with the user activity. The detection component 112 may be configured to identify individual work unit records associated with user activity in order to obtain the relevant trigger event criteria to compare against the user activity that has occurred. The detection component 112 may be configured to determine that trigger event criteria are satisfied responsive to the detection of the occurrence of user activity that forms the basis of trigger events. The detection component 112 may be configured to determine that trigger event criteria are not satisfied responsive to the detection of the occurrence of user activity that does not form the basis of trigger events.

The detection component 112 may be configured to execute one or more responses. The detection component 112 may be configured to execute one or more responses responsive to occurrence of the user activity and/or determinations that trigger event criteria are satisfied.

The detection component 112 may be configured to execute individual responses based on identifying individual work unit records of individual pages associated with the user activity. Responsive to identifying individual work unit records, detection component 112 may be configured to obtain relevant trigger response values for one or more trigger response parameters for the individual work until records that define individual responses to be executed. The detection component 112 may query the trigger response values to determine the response type and the response definition specified by the trigger response values in order to execute an individual response.

The user interface component 110 may be configured to update user interface information communicated to client computing platform(s) 104 of the users based on executed responses. By way of non-limiting illustration, users who are subjects of responses may be provided views of, and access to, pages of newly generated work unit records and/or newly assigned work unit records that serve as notifications of user activity that triggered one or more responses. By way of non-limiting illustration, users who are subjects of responses may be sent one or more internal messages that serve as notifications of user activity that triggered one or more responses.

In some implementations, for external notification type responses, user interface component 110 may be configured to identify one or more external resources 126 through which one or more external notifications may be effectuated. The user interface component 110 may be configured to communicate with one or more external resources 126 to cause an external resource to send one or more messages. By way of non-limiting illustration, user interface component 110 may be configured to perform an application programming interface (API) call and/or other interaction with the external resource(s) to cause the external resource(s) to send one or more messages. An API interaction may include one or more of Remote Procedure Call, Representational State Transfer, GraphQL, and/or other interaction. By way of non-limiting illustration, user interface component 110 may be configured to cause a message to be sent through a third-party messaging application.

By way of non-limiting illustration, in some implementations, the first response may include one or more of generating a second work unit record and assigning the second work unit record to the first user. The second work unit record may include a title that references a title of the first work unit record and/or includes other information. The second work unit record may include a description including one or more of an identification of the second user, a description of the first user activity performed by the second user, and/or other information. By way of non-limiting illustration, in some implementations, the first response may include sending a first message to the first user through a messaging application. The message application may comprise a third-party application.

Figure 3:
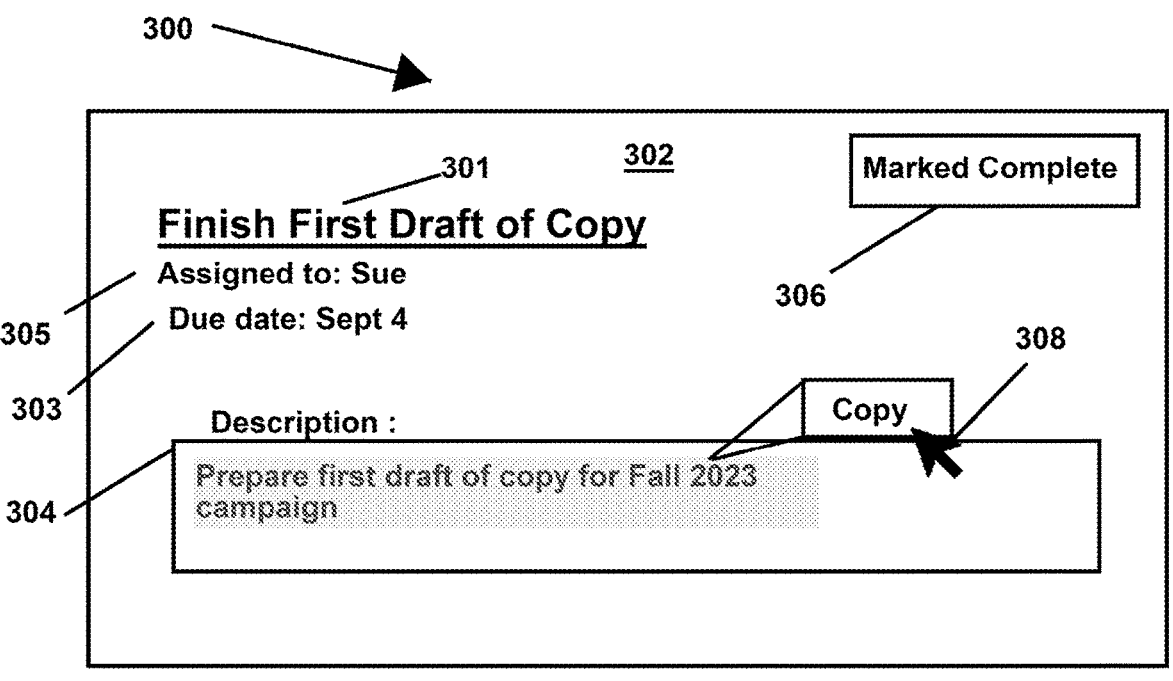
FIG. 3 illustrates a user interface of a collaboration environment showing a work unit page, in accordance with one or more implementations.

FIG. 3 illustrates a user interface 300 of a collaboration environment, in accordance with one or more implementations. The user interface 300 may include a view of a collaboration environment. In particular, the user interface 300 may comprise a work unit page 302 for a unit of work through which users access a work unit record for the unit of work. The user interface 300 may display values of one or more work unit parameters and/or other information. By way of non-limiting illustration, a user interface element 301 may display a title of the task (e.g., "Finish First Draft of Copy"). A user interface element 305 may display an assignee of the task (e.g., "Sue"). A user interface element 303 may display a due date of the task (e.g., "September 4"). A user interface element or portion 304 may display a description of the task. A user interface element 306 may be configured to receive user input to change a completion status, e.g., mark the task as complete via a virtual button.

The work unit page 302 may provide a basis for identifying user activity that causes trigger event criteria to be satisfied. Although not shown, the work unit page 302 may include a user interface element, such as drop down menu, where a user who wishes to receive notifications of user activity can select the user interface element to cause trigger notification information to be generated, with them as the subject of response(s). In some implementations, the user interface element may be configured so that it is only visible and/or selectable by users of a given role, e.g., manager, supervisor, etc. In this way, other users whose activity may be identified as a trigger event may be unaware of the tracking and/or subsequent responses being carried out.

In accordance with trigger notification information, a user may interact with the work unit page 302 by selecting text making up the description within user interface portion 304. By way of non-limiting illustration, through interaction with a cursor 308, a user may select text for the purpose of copying the text. These actions may comprise user activity of the passive activity type because they do not otherwise result in a change or impact in the visual presentation of the text in the description and/or the underlying work unit record for which the work unit page 302 provides access to. Conversely, actions such as adding or removing text, changing or removing assignee, changing or removing a due date, marking the task an incomplete, and/or other user activity may comprise user activity of the active activity type that changes or impacts the visual representation within the work unit page 302 and/or content of the underlying work unit record.

Figure 4:
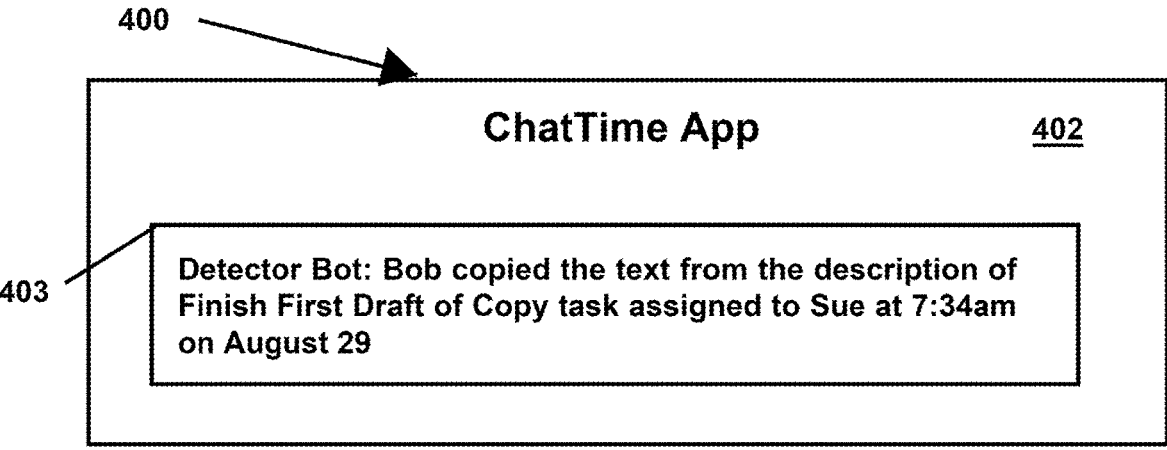
FIG. 4 illustrates a user interface of an external resource, in accordance with one or more implementations.

FIG. 4 illustrates a user interface 400 of an external resource, in accordance with one or more implementations. By way of non-limiting illustration, the external resource may include a messaging application. The user interface 400 may comprise a view of a chat session 402 facilitated through the external resource. By way of non-limiting illustration, the user interface may display a chat window 403 for a chat session through which a user may be provided an automated message relating to a detected user activity. For example, if the user performing the selection and/or copying of text as illustrated in FIG. 3 was user "Bob," an automated message may be sent to a designated user which describes the user activity, identifies the user, provides a timestamp, and/or includes other information. In some implementations, the title of the unit of work from which the activity derived may be selectable (e.g., comprises a link) to cause the work unit page 302 of FIG. 3 to be presented.

Figure 5:
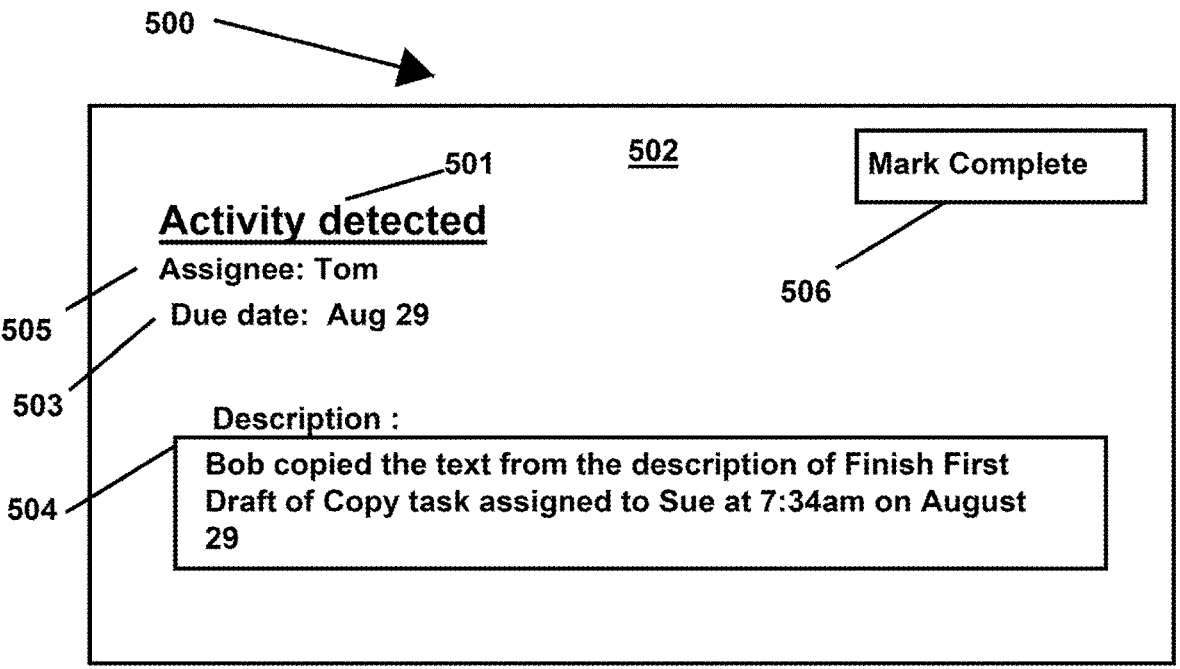
FIG. 5 illustrates a user interface of a collaboration environment showing a work unit page for a work unit record created as a response to a trigger event, in accordance with one or more implementations.

FIG. 5 illustrates a user interface 500 of a collaboration environment, in accordance with one or more implementations. The user interface 500 may include a view of a collaboration environment. In particular, the user interface 500 may comprise a work unit page 502 for a unit of work through which users access a work unit record for the unit of work. The work unit record may be a record that is automatically generated as a response to user activity that forms the basis of a trigger event (e.g., as described in FIG. 3). The user interface 500 may display values of one or more work unit parameters and/or other information. By way of non-limiting illustration, a user interface element 501 may display a title that reflects it was generated as a response to a trigger event (e.g., "activity detected"). A user interface element 505 may display an assignee of the unit of work who may be the user who initially requested to be notified of detected activity (e.g., "Tom"). A user interface element 503 may display a due date which may be a date the activity was detected (e.g., "August 29") and/or other date. A user interface element or portion 504 may display a description of one or more of the user activity, identify of a user who performed the activity, a timestamp, and/or includes other information. A user interface element 506 may be configured to receive user input to change a completion status.

Referring back to FIG. 1, in some implementations, server(s) 102, client computing platform(s) 104, and/or external resource(s) 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126 and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112 and/or other components. Processor(s) 130 may be configured to execute components 108, 110, 112 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
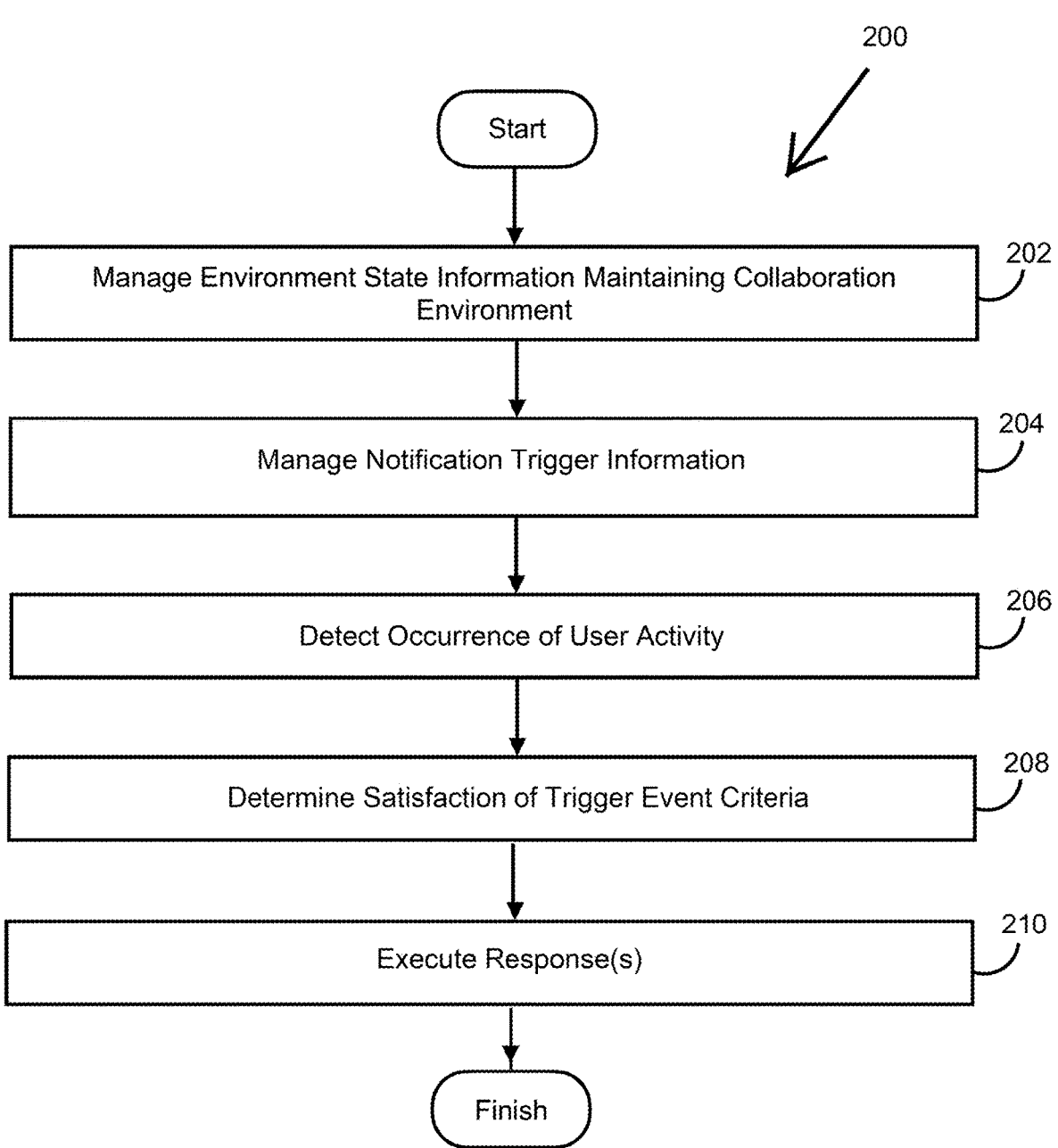
FIG. 2 illustrates a method to trigger notifications based on user activity in a collaboration environment, in accordance with one or more implementations.

FIG. 2 illustrates a method 200 to track user activity within a collaboration environment and/or generate activity logs for activity that accounts for substantive progress toward completion of work, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a virtual collaboration environment (sometimes referred to simply as "collaboration environment"). The virtual collaboration environment may be configured to facilitate interactions by users with the virtual collaboration environment. The users may interact with the virtual collaboration environment by accessing the virtual collaboration environment via remotely located client computing platforms over one or more Internet connections. The environment state information may include work unit records and/or other records. The work unit records may include work unit information describing units of work managed by the users, created by the users, and/or assigned within the virtual collaboration environment to the users who are expected to accomplish one or more actions to complete the units of work. Operation 202 may be performed by one or more hardware processors configured by machine-readable instructions including a component that is the same as or similar to environment state component 108 (shown in FIG. 1 and described herein), in accordance with one or more implementations.

An operation 204 may manage notification trigger information and/or other information. The notification trigger information may include trigger event definitions and/or other information. The trigger event definitions may include one or more of trigger event criteria, trigger response values for trigger response parameters of the work unit records, and/or other information. The trigger event criteria may define user activity in the virtual collaboration environment that form the basis of trigger events. Occurrence of the user activity may cause the trigger event criteria to be satisfied. The trigger response parameters may characterize responses to be taken responsive to satisfaction of the trigger event criteria. The responses may include, generally, actions that cause one or more users to be notified. By way of non-limiting illustration, a first work unit record may include first notification trigger information including a first trigger event definition. The first trigger event definition may include a first trigger event criterion and a first response value of a first trigger response parameter. The first trigger event criterion may define a first user activity that forms the basis of a first trigger event. The first response value of the first trigger response parameter may characterize a first response to be taken responsive to satisfaction of the first trigger event criterion (e.g., occurrence of the first user activity by one or more users). Operation 204 may be performed by one or more hardware processors configured by machine-readable instructions including a component that is the same as or similar to environment state component 108 (shown in FIG. 1 and described herein), in accordance with one or more implementations.

An operation 206 may detect occurrence of the user activity that forms the basis of the trigger events, and/or detect occurrence of other user activity. By way of non-limiting illustration, an occurrence of the first user activity being performed by a second user may be detected. Operation 206 may be performed by one or more hardware processors configured by machine-readable instructions including a component that is the same as or similar to detection component 112 (shown in FIG. 1 and described herein), in accordance with one or more implementations.

An operation 208 may determine whether trigger event criteria are satisfied. Satisfaction of trigger event criteria may be determined responsive to the detection of the occurrence of user activity that forms the basis of trigger events. Operation 208 may be performed by one or more hardware processors configured by machine-readable instructions including a component that is the same as or similar to detection component 112 (shown in FIG. 1 and described herein), in accordance with one or more implementations.

An operation 210 may execute one or more responses. Response(s) may be executed responsive to occurrence of the user activity and/or determinations that trigger event criteria are satisfied. Operation 210 may be performed by one or more hardware processors configured by machine-readable instructions including a component that is the same as or similar to detection component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to trigger notifications based on user activity in a collaboration environment, the system comprising:

non-transitory electronic storage storing environment state information maintaining a virtual collaboration environment, the virtual collaboration environment being configured to facilitate interactions by users with the virtual collaboration environment, the users interacting with the virtual collaboration environment by accessing the virtual collaboration environment via remotely located client computing platforms over one or more Internet connections, the environment state information including:

work unit records, the work unit records including notification trigger information and work unit information, the work unit information describing units of work managed by the users, created by the users, and assigned within the virtual collaboration environment to the users who are expected to accomplish one or more actions to complete the units of work, the notification trigger information including trigger event definitions, the work unit records including a first work unit record for a first unit of work, the first work unit record including first work unit information for the first unit of work and first notification trigger information; and one or more physical processors configured by machine-readable instructions to:

manage the notification trigger information of the work unit records, the trigger event definitions including trigger event criteria and trigger response values for trigger response parameters of the work unit records, the trigger event criteria defining user activity in pages of a user interface of the virtual collaboration environment that form the basis of trigger events, individual ones of the pages corresponding to individual ones of the work unit records, such that occurrence of the user activity causes the trigger event criteria to be satisfied, and wherein the trigger response parameters characterize responses to be taken responsive to satisfaction of the trigger event criteria, such that the first notification trigger information of the first work unit record is generated by a first user and includes:

a first trigger event definition, the first trigger event definition including:

a first trigger event criterion and a first response value of a first trigger response parameter, the first trigger event criterion defining a first user activity within a first page associated with the first work unit record that forms the basis of a first trigger event, and wherein the first response value of the first trigger response parameter characterizes a first response to be taken responsive to satisfaction of the first trigger event criterion;

detect occurrence of the user activity in the pages corresponding to the work unit records that forms the basis of the trigger events, such that an occurrence of the first user activity in the first page being performed by a second user is detected; and responsive to the detection of the occurrence of the user activity in the pages, determine that the trigger event criteria are satisfied and execute the responses, such that responsive to the detection of the occurrence of the first user activity in the first page by the second user, determine the first trigger event criterion is satisfied and execute the first response.

2. The system of claim 1, wherein:

the user activity is characterized by activity types, the activity types including passive activity type and active activity type, wherein the user activity of the passive activity type include the interactions by the users that do not impact appearance of the pages of the user interface of the virtual collaboration environment that provide access to the work unit information of the work unit records, and the user activity of the active activity type include the interactions of the users that do impact the appearance of the pages; and the user activity that form the basis of the trigger events are the user activity of the passive activity type.

3. The system of claim 2, wherein the user activity of the passive activity type include one or more of viewing a page of a work unit record, copying text presented within the page of the work unit record, copying a link to the page of the work unit record, or adding a user as a collaborator of the work unit record.

4. The system of claim 1, wherein the notification trigger information is stored as part of the work unit information of the individual ones of the work unit records, such that the first notification trigger information is stored as part of the first work unit information of the first work unit record.

5. The system of claim 1, wherein the one or more physical processors are further configured by the machine-readable instructions to:

effectuate communication of user interface information to the remotely located client computing platforms over the one or more Internet connections, wherein the user interface information causes the remotely located client computing platforms to present instances of the user interface of the virtual collaboration environment through which the users interact with the virtual collaboration environment;

obtain user input information conveying user input into the instances of the user interface, the user input indicating requests to generate the notification trigger information for the individual ones of the work unit records; and generate the notification trigger information in response to obtaining the user input information, such that responsive to obtaining first user input information conveying first user input in a first instance of the user interface presented on a first computing platform associated with the first user, generate the first notification trigger information for the first work unit record.

6. The system of claim 5, wherein the users who provide the user input indicating the requests are subjects of the responses, such that the first user is a subject of the first response.

7. The system of claim 6, wherein the instances of the user interface display the pages associated with the work unit records, wherein the pages include instances of a user interface element that, when selected, initiates the requests to generate the notification trigger information, such that the first page displays an instance of the user interface element, and wherein the first user input includes selection of the user interface element from the first page.

8. The system of claim 1, wherein the responses include one or more of generating a new work unit record, assigning a work unit record, sending a message through a messaging application, or creating an incident report.

9. The system of claim 8, wherein the first response includes generating a second work unit record and assigning the second work unit record to the first user, wherein the second work unit record includes a title that references detected activity, and includes a description of the first user activity performed by the second user.

10. The system of claim 8, wherein the first response includes sending a first message to the first user through the messaging application, wherein the message application is a third-party application.

11. A method to trigger notifications based on user activity in a collaboration environment, the method comprising:

storing environment state information maintaining a virtual collaboration environment, the virtual collaboration environment being configured to facilitate interactions by users with the virtual collaboration environment, the users interacting with the virtual collaboration environment by accessing the virtual collaboration environment via remotely located client computing platforms over one or more Internet connections, the environment state information including:

work unit records, the work unit records including notification trigger information and work unit information, the work unit information describing units of work managed by the users, created by the users, and assigned within the virtual collaboration environment to the users who are expected to accomplish one or more actions to complete the units of work, the notification trigger information including trigger event definitions, the work unit records including a first work unit record for a first unit of work, the first work unit record including first work unit information for the first unit of work and first notification trigger information;

managing the notification trigger information of the work unit records, the trigger event definitions including trigger event criteria and trigger response values for trigger response parameters of the work unit records, the trigger event criteria defining user activity in pages of a user interface of the virtual collaboration environment that form the basis of trigger events, individual ones of the pages corresponding to individual ones of the work unit records, such that occurrence of the user activity causes the trigger event criteria to be satisfied, and wherein the trigger response parameters characterize responses to be taken responsive to satisfaction of the trigger event criteria, such that the first notification trigger information of the first work unit record is generated by a first user and includes:

a first trigger event definition, the first trigger event definition including:

a first trigger event criterion and a first response value of a first trigger response parameter, the first trigger event criterion defining a first user activity within a first page associated with the first work unit record that forms the basis of a first trigger event, and wherein the first response value of the first trigger response parameter characterizes a first response to be taken responsive to satisfaction of the first trigger event criterion;

detecting occurrence of the user activity in the pages corresponding to the work unit records that forms the basis of the trigger events, including detecting an occurrence of the first user activity in the first page being performed by a second user; and responsive to the detection of the occurrence of the user activity in the pages, determining that the trigger event criteria are satisfied and executing the responses, including responsive to the detection of the occurrence of the first user activity in the first page by the second user, determining the first trigger event criterion is satisfied and executing the first response.

12. The method of claim 11, wherein:

the user activity is characterized by activity types, the activity types including passive activity type and active activity type, wherein the user activity of the passive activity type include the interactions by the users that do not impact appearance of the pages of the user interface of the virtual collaboration environment that provide access to the work unit information of the work unit records, and the user activity of the active activity type include the interactions of the users that do impact the appearance of the pages; and the user activity that form the basis of the trigger events are the user activity of the passive activity type.

13. The method of claim 12, wherein the user activity of the passive activity type include one or more of viewing a page of a work unit record, copying text presented within the page of the work unit record, copying a link to the page of the work unit record, or adding a user as a collaborator of the work unit record.

14. The method of claim 11, wherein the notification trigger information is stored as part of the work unit information of the individual ones of the work unit records, such that the first notification trigger information is stored as part of the first work unit information of the first work unit record.

15. The method of claim 11, further comprising:

effectuating communication of user interface information to the remotely located client computing platforms over the one or more Internet connections, wherein the user interface information causes the remotely located client computing platforms to present instances of the user interface of the virtual collaboration environment through which the users interact with the virtual collaboration environment;

obtaining user input information conveying user input into the instances of the user interface, the user input indicating requests to generate the notification trigger information for the individual ones of the work unit records; and generating the notification trigger information in response to obtaining the user input information, including responsive to obtaining first user input information conveying first user input in a first instance of the user interface presented on a first computing platform associated with the first user, generating the first notification trigger information for the first work unit record.

16. The method of claim 15, wherein the users who provide the user input indicating the requests are subjects of the responses, such that the first user is a subject of the first response.

17. The method of claim 16, wherein the instances of the user interface display the pages associated with the work unit records, wherein the pages include instances of a user interface element that, when selected, initiates the requests to generate the notification trigger information, such that the first page displays an instance of the user interface element, and wherein the first user input includes selection of the user interface element from the first page.

18. The method of claim 11, wherein the responses include one or more of generating a new work unit record, assigning a work unit record, sending a message through a messaging application, or creating an incident report.

19. The method of claim 18, wherein the first response includes generating a second work unit record and assigning the second work unit record to the first user, wherein the second work unit record includes a title that references detected activity, and includes a description of the first user activity performed by the second user.

20. The method of claim 18, wherein the first response includes sending a first message to the first user through the messaging application, wherein the message application is a third-party application.

* * * * *